Patented Nov. 14, 1950

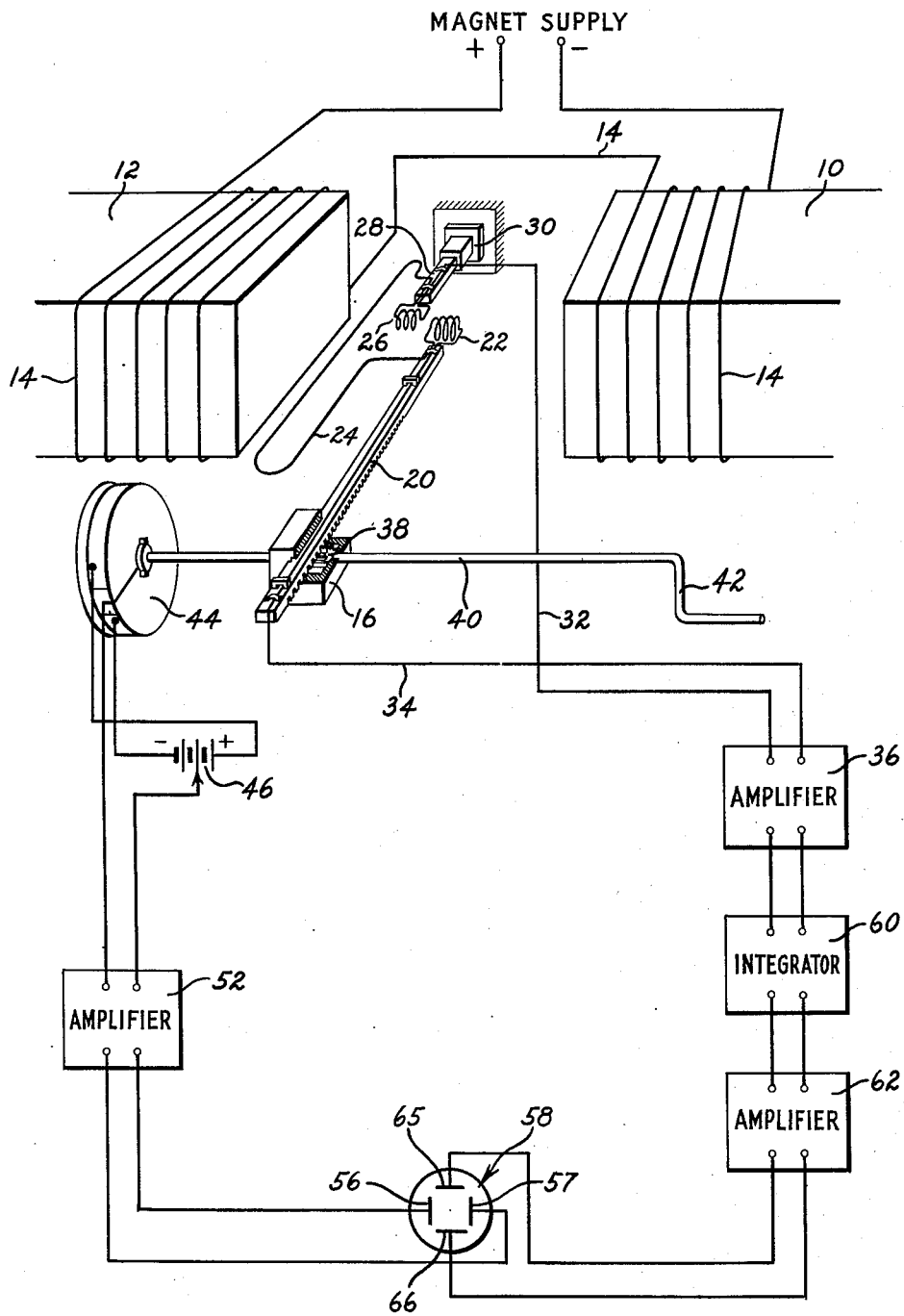

2,530,176

UNITED STATES PATENT OFFICE 2,530,176

APPARATUS FOR MEASURING LOCAL VARIATIONS IN FLUX DENSITY IN A MAGNETIC FIELD

Wilson M. Powell, Berkeley, Calif., assignor to the United States of America as represented by the United States Atomic Energy Commission Application September 2, 1944, Serial No. 552,545

2 Claims. (Cl. 175—183)

The present invention relates to apparatus for measuring local variations in flux density of magnetic fields, and more particularly to improved apparatus of the type noted for measuring such variations in flux density of magnetic fields of electromagnets.

Variations in the current traversing the winding of an electromagnet, which often occur instantaneously, increase or decrease the total flux of the magnetic field of the electromagnet and consequently the over-all flux density of the magnetic field, which is hereinafter referred to as an absolute variation in flux density.

In determining local variations in flux density, measuring apparatus is employed including a search coil which is moved relative to the magnetic field of the electromagnet. In such apparatus, the output of the search coil reflects not only local variations in flux density of the magnetic field, but also absolute variations in flux density of the magnetic field resulting from changes in the total flux of the magnetic field. Accordingly, the search coil does not produce a measurement which is a true indication of the local variations in flux density of the magnetic field, as is desired.

A preferred embodiment of flux measuring apparatus as heretofore used, is of the general type disclosed in the application of Ernst H. Plesset, Serial No. 522,145, filed February 12, 1944, now Patent No. 2,506,433. Such an apparatus essentially comprises a device responsive to the flux density of a magnetic field, and preferably embodying a search coil; means for moving said device along a predetermined path in the aforementioned magnetic field, whereby said device is productive of a voltage as a function of the variation in flux density; means for amplifying said voltage thereby to produce a current as a function of said voltage; means for integrating said current thereby to produce a first control voltage which is relatively independent of the speed of movement of said flux responsive device through the aforementioned magnetic field; an element which is productive of a second control voltage as a function of the position of the flux responsive device along its predetermined path; and indicating means, preferably of the oscilloscope character, upon which said first and second control voltages are impressed, whereby a sweep is produced along two coordinates, giving an indication as a representation of local variations in flux density.

The apparatus just described, and apparatus of this general class, have heretofore been subject to the inaccuracies hereinabove referred to; namely, the voltage response of the search coil includes a component representative of absolute changes in flux density, whereby the total response of the apparatus is not indicative of local variations in flux density alone. The present invention is embodied in means for compensating for the inaccuracies of this type, and constitutes an improvement of the apparatus of the above noted application of Ernst H. Plesset.

It is therefore an object of the invention to provide an improved flux measuring apparatus which measures only local variations in flux density.

It is another object of the invention to provide flux measuring apparatus having an improvement including means for compensating for absolute variations in flux density.

It is another object of the invention to provide flux measuring apparatus of the moving coil type improved by the inclusion of means for compensating for absolute variations in flux density during movement of the coil.

It is a further object of the invention to provide flux measuring apparatus having local and absolute variations in flux density represented by a voltage generated in a moving coil, and wherein this voltage is opposed by a voltage generated in a stationary coil, thereby compensating for changes in absolute flux density.

Still another object of the invention is to provide a flux measuring device of the oscilloscope indicating character, having a compensating device for absolute variations in flux density.

The invention, both as to its organization and method of operation, together with other objects and advantages thereof, will best be understood by reference to the following specification taken in connection with the accompanying drawings, in which the figure of the drawing is a perspective view of an electromagnet which is provided with measuring apparatus, partly in perspective and partly schematic, embodying one form of the invention. The drawing and the description represent but one interpretation of the invention and are therefore to be considered as an example only, and not as a limitation of the invention.

Referring now to the figure of the drawing, there is shown a magnet structure with which is associated apparatus incorporating the invention. More particularly, this structure includes pole pieces of an electromagnet. In detail, there are provided pole pieces 10 and 12 forming magnetic poles of opposite polarity. These pole pieces 10 and 12 have a series winding 14 which is connected to any suitable source of direct current, not shown. A magnetic field is set up between pole pieces 10 and 12 when electric current passes through winding 14, and the present invention measures the homogeneity of this field thus established by measuring the variations in flux density of the field.

Generally speaking, the invention essentially comprises means movable in the aforementioned magnetic field, producing a response related to the local and absolute variations of flux density, and combining with said movable means a device for compensating for absolute variations in flux density. More particularly, it comprises a flux cutting device movable in said field, and a compensating device to correct for absolute variations in flux density. In detail, a movable coil 22 is provided for relative movement with respect to the magnetic field, and a stationary coil 26 is fixed in the magnetic field and is responsive to absolute variations in flux density. These coils 22 and 26 are connected by a conductor 24, so that they are in opposed series relationship. Preferably, the conductor 24 is flexible so as to accommodate the movement of the coil 22. The opposite terminals of the coils 22 and 26 are connected to conductors 34 and 32, respectively, which lead to an amplifier 36, and these conductors, together with conductor 24 and coils 22 and 26, comprise a circuit network in which the voltages of the coils induced by absolute variations are opposed to each other.

It will be noted that the stationary coil 26 is mounted in a suitable manner, such as by a standard 28 secured to a base 30. Suitable means are employed to move coil 22 in the magnetic field and may take the form of a rack 20 to which coil 22 is appropriately affixed, moved by the pinion 38 which is mounted in driving relationship thereto by its shaft 40 rotatably mounted in a journal box 16. A hand crank 42 is used to move rack 20, but it is understood that any equivalent means may be employed such as an electric motor, a compressed spring, or other means to furnish the necessary power.

Referring now to the indicator system with which the present embodiment of the invention is illustrated, there is provided means for integrating the voltage output of the circuit network previously described, and also means for producing a second voltage, preferably as a linear function of the position of search coil 22 along its predetermined path. Considering first the flux measuring response voltage from coils 22 and 26, the amplifier 36 acts to produce a current proportional to the voltage output of the network. This current is integrated in an integrator 60, which instrument is suitably connected to amplifier 36, and is productive of an integrated voltage which in turn is amplified in an amplifier 62 of any desired form. The amplified voltage output of amplifier 62 is suitably connected to vertical sweep plates 65 and 66 of an oscilloscope 58.

Considering now the second control voltage, a battery 46 supplies voltage to a potentiometer 44 connected to shaft 40, and consequently operated as a function of the position of the search coil 22. The variable voltage output of potentiometer 44 is impressed upon a voltage amplifier 52, and the amplified voltage is impressed upon horizontal sweep plates 56 and 57 of the oscilloscope 58. The effect of the second control voltage is to produce a horizontal sweep on the indicating face (not shown) of the oscilloscope 58, which, in conjunction with the first control voltage, produces a two-dimensional graph of the integrated local variations of flux density as a function of the location of such variations in the magnetic field.

The description of the illustrated embodiment of the invention having been completed, the operation of the apparatus will now be explained. Electric current is supplied to winding 14, energizing the magnet to produce opposite poles at pole pieces 10 and 12. A magnetic field is thereupon set up between these pole pieces, and this field may have variations in flux density, not only local variations as a function of the physical characteristics of the magnet, but also absolute variations as a function of the instantaneous current through the winding 14. The apparatus described measures the former variation while substantially excluding the latter by employing the principle of the present invention.

Referring now to operation when there are no absolute variations in flux density, the rack 20 is so positioned that the search coil 22 is initially placed at one extreme edge of the magnetic field. The hand crank 42 is then operated, propelling the search coil 22 through the magnetic field at a rapid rate. The local variations, if any, in the flux density of the magnetic field induce a voltage in coil 22, and this voltage is impressed upon amplifier 36 which produces a current as a function of the voltage. This current is integrated in integrator 60, producing a voltage which is related to the voltage originally induced in search coil 22. This voltage is in turn amplified in amplifier 62 and applied to the vertical sweep plates 65 and 66 of the oscilloscope 58, producing a sweep in a vertical direction on the indicating face (not shown) of the oscilloscope 58.

The movement of search coil 22 through the magnetic field also produces a horizontal sweep on the oscilloscope, because of the driving connection of the shaft 40 between the rack 20 and the potentiometer 44. The battery 46 supplies the voltage which is regulated by potentiometer 44, preferably linearly, as a function of the position of coil 22 on its path. The resultant voltage is amplified by amplifier 52 and is impressed upon the horizontal sweep plates 56 and 57 of the oscilloscope 58. The combination of the horizontal sweep and the integrated vertical sweep produces a graph of the strength of the magnet along the predetermined path. If coil 22 is moved rapidly enough, the entire graph may be made to appear on the indicating face of the oscilloscope at any one instant.

If there should be any absolute variations in flux density while the search coil 22 is being used, a voltage is induced in the search coil as a function of this absolute variation. This voltage does not disrupt the indication of local variations, however, because stationary coil 26 is also in the magnetic field and produces an equal voltage, and because of the opposed series connection the voltage of the stationary coil opposes the voltage of the search coil due to absolute variations, giving a time indication of local variations of flux density only. It is of course understood that if the degree of local variation in flux density is of a magnitude comparable with that of the average flux density, the compensation effected by the stationary coil 26 will not be precise. Furthermore, it is preferred to have this stationary coil 26 constructed and positioned so that the voltage induced therein by an absolute change in flux density will be the same as that which would be induced in the search coil when the latter is at a position in the field wherein the linking flux through it is equal to the average flux intercepted by the search coil in its path of motion through the field.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for measuring the distribution of magnetic flux in the gap of a magnet the strength of which is subject to time variation, which apparatus comprises a reference coil disposed at a fixed reference position in said gap and having its axis extending in the same direction as the flux therein, a search coil disposed in said gap with its axis extending in parallelism with the axis of said reference coil, means for moving said search coil along a predetermined path normal to the lines of flux in said gap, a circuit network including said reference coil and said search coil differentially connected therein for producing a voltage in accordance with a change in the difference in the density of the magnetic flux simultaneously passing through the two coils, and means including an integrating device connected in said network for integrating said voltage for indicating differences in simultaneous values of magnetic flux density at different positions on said path.

2. Apparatus for measuring the distribution of magnetic flux in the gap of a magnet the strengh of which is subject to time variation, which apparatus comprises a reference coil disposed at a fixed reference position in said gap and having its axis extending in the same direction as the flux therein, a search coil disposed in said gap with its axis extending in parallelism with the axis of said reference coil, means for moving said search coil along a predetermined path normal to the lines of flux in said gap, a circuit network including said reference coil and said search coil differentially connected therein for producing a voltage in accordance with a change in the difference in the density of the magnetic flux simultaneously passing through the two coils, integrating means connected in said network for integrating the voltages induced in said coils, an oscilloscope connected to said integrating means for giving a visual indication of said integrated voltages, and means including a potentiometer interconnecting said moving means and said oscilloscope to provide on the latter a linear sweep of said indication corresponding to the various positions of said search coil.

WILSON M. POWELL.

REFERENCES CITED

The following references are of record in the file of this patent:

UNITED STATES PATENTS

| Number | Name | Date |
|---|---|---|
| Re. 18,555 | Sperry | Aug. 2, 1932 |
| 1,892,826 | Bettison et al. | Jan. 3, 1933 |
| 1,933,351 | Suits et al. | Oct. 31, 1933 |
| 2,041,058 | Fossati | May 19, 1936 |

FOREIGN PATENTS

| Number | Country | Date |
|---|---|---|
| 296,303 | Great Britain | May 30, 1929 |

OTHER REFERENCES

The Engineer, pages 667–669, Dec. 27, 1935.